Nov. 22, 1966 W. J. VEARY ET AL 3,286,298
CASTER ASSEMBLY
Filed Dec. 8, 1964 2 Sheets-Sheet 1
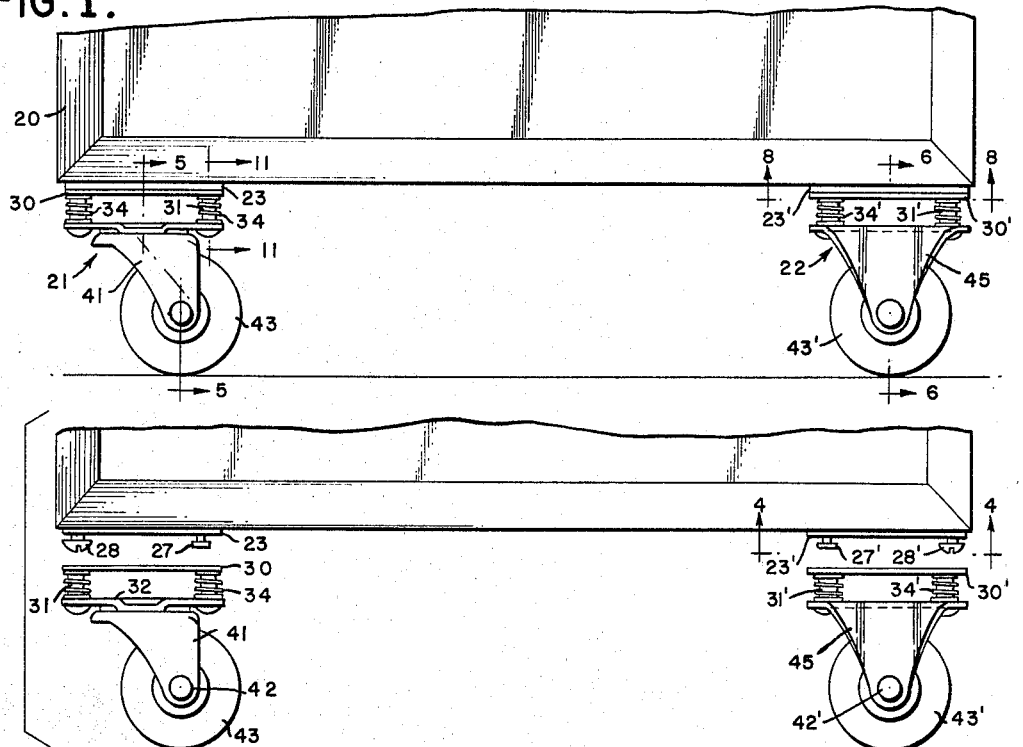
FIG. 1.
FIG. 2.
FIG. 3.
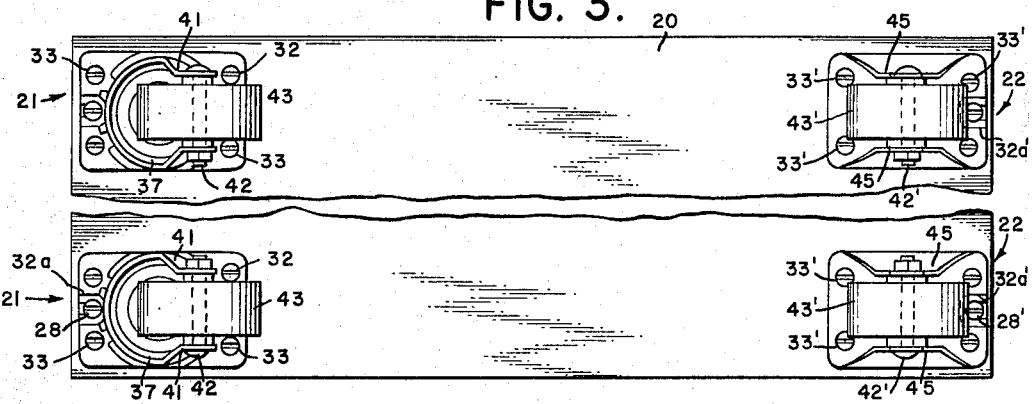
FIG. 4.
FIG. 10.
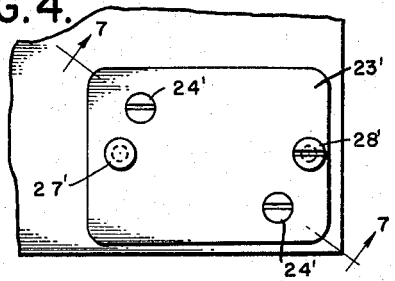
INVENTORS
William J. Veary
Aldo J. DeRossi
BY Garvey + Garvey
ATTORNEYS Nov. 22, 1966    W. J. VEARY ET AL    3,286,298
CASTER ASSEMBLY
Filed Dec. 8, 1964    2 Sheets-Sheet 2
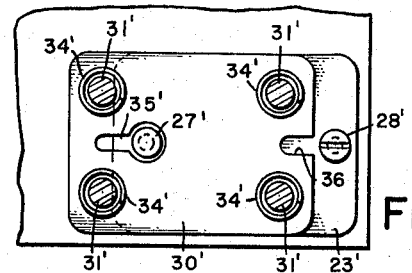
FIG. 8.
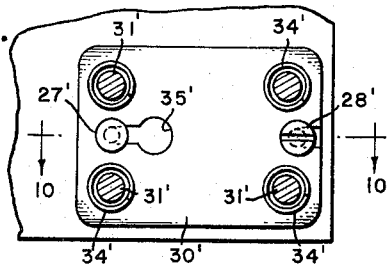
FIG. 9.
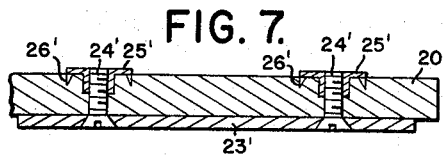
FIG. 7.    FIG. 11.
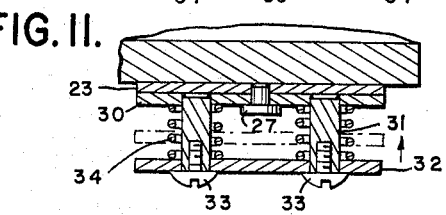
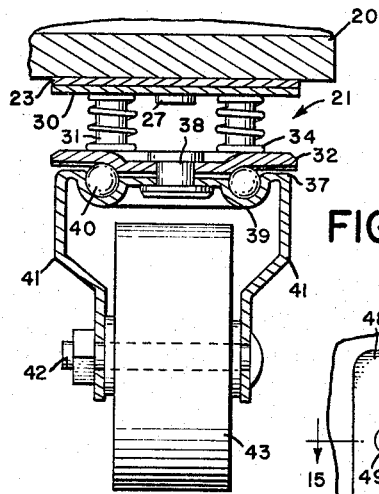
FIG. 5.
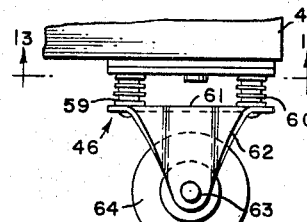
FIG. 12.
FIG. 14.    FIG. 13.
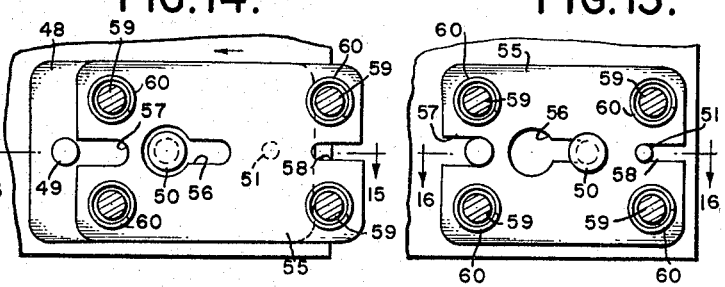
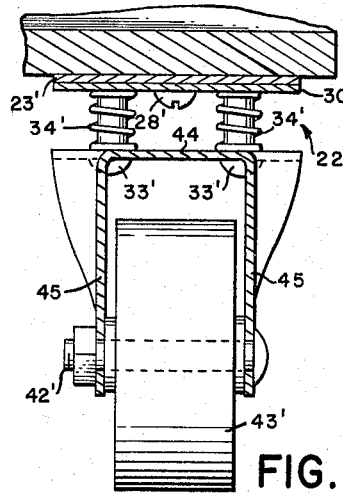
FIG. 15.
FIG. 17.
INVENTORS
William J. Veary
Aldo J. De Rossi
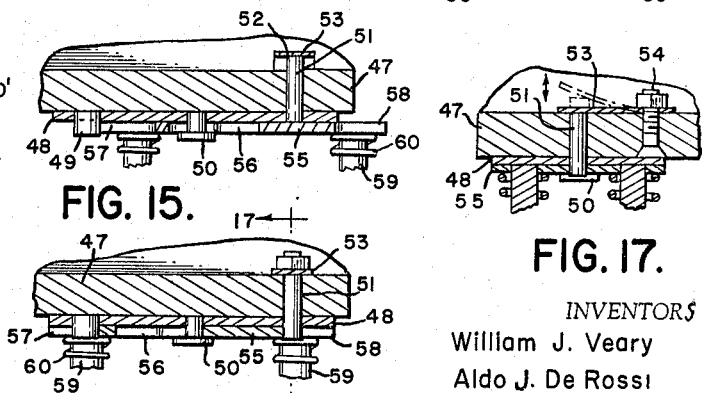
FIG. 16.
FIG. 6.
BY Garvey & Garvey
ATTORNEYS United States Patent Office 3,286,298
Patented Nov. 22, 1966

3,286,298
CASTER ASSEMBLY
William J. Veary, 146 Rockland St., and Aldo J. De Rossi, 124 Francis St., both of New Bedford, Mass.
Filed Dec. 8, 1964, Ser. No. 416,728
4 Claims. (Cl. 16—44)

This invention relates to a caster assembly and more particularly to a shock-resistant caster assembly for attachment to objects of various miscellany to facilitate rolling movement thereof.

It is an object of this invention to provide a multi-part caster assembly including a stationary part adapted to be permanently affixed to an object to be rolled about, and a removable wheel unit detachably engaged with the stationary part to permit removal when the object has reached its destination.

Another object is to provide a caster assembly of the character described, of either swivel or stationary type which may be readily fitted on large cases of various miscellany including sample cases, musical instrument cases, amplifying equipment, etc., the wheel unit being positively held in operative position when in use and readily detached without removing screws, bolts or other securing means.

Other objects of the invention will be manifest from the following description of the present preferred forms of the invention taken in connection with the accompanying drawings, wherein:

FIG. 1 is a side elevational view of a swivel caster assembly and a stationary caster assembly constructed in accordance with the present invention, illustrating their application to an object to be rolled from place to place and showing the wheel units of the caster assemblies in operative position;

FIG. 2 is a view similar to FIG. 1, showing the caster assemblies in inoperative position, with the wheel units removed;

FIG. 3 is a fragmentary bottom plan view of a case or the like having swivel caster assemblies and stationary caster assemblies made in accordance with the present invention attached thereto;

FIG. 4 is an enlarged bottom plan view taken along the lines 4—4 of FIG. 2, looking in the direction of the arrows;

FIG. 5 is an enlarged sectional view taken along the lines 5—5 of FIG. 1, looking in the direction of the arrows, and illustrating a swivel caster assembly constructed in accordance with the present invention;

FIG. 6 is an enlarged sectional view taken along the lines 6—6 of FIG. 1, looking in the direction of the arrows, and illustrating a stationary caster assembly constructed in accordance with the present invention;

FIG. 7 is an enlarged sectional view taken along the lines 7—7 of FIG. 4, looking in the direction of the arrows;

FIG. 8 is an enlarged sectional view taken along the lines 8—8 of FIG. 1, looking in the direction of the arrows;

FIG. 9 is a sectional view similar to FIG. 8, illustrating the manner of engaging and disengaging the wheel unit and the mounting plate forming parts of the present invention;

FIG. 10 is an enlarged sectional view taken along the lines 10—10 of FIG. 8, looking in the direction of the arrows;

FIG. 11 is an enlarged sectional view taken along the lines 11—11 of FIG. 1, looking in the direction of the arrows;

FIG. 12 is a side elevational view of a modified form of caster assembly;

FIG. 13 is an enlarged sectional view taken along the lines 13—13 of FIG. 12, looking in the direction of the arrows;

FIG. 14 is a view similar to FIG. 13, illustrating the manner of disengaging the swivel unit from the mounting plate;

FIG. 15 is a sectional view taken along the lines 15—15 of FIG. 14, looking in the direction of the arrows;

FIG. 16 is a sectional view taken along the lines 16—16 of FIG. 13, looking in the direction of the arrows; and FIG. 17 is a sectional view taken along the lines 17—17 of FIG. 16, looking in the direction of the arrows and illustrating the manner of removing the swivel unit from the mounting plate.

Referring now in greater detail to the drawings there is illustrated in FIGS. 1 and 3, a case 20 or the like, to which a spaced pair of swivel caster assemblies 21 are affixed at one end, and a spaced pair of stationary caster assemblies 22 are affixed at the other end.

Each swivel caster assembly 21 includes a mounting plate 23 of flat, generally rectangular shape, having a plurality of counter-bored openings therein, through which flat-headed bolts 24 are passed, the bolts extending through the bottom of case 20 into threaded engagement with T nuts 25 fixed to the bottom of case 20, by barbed members 26. This fixedly and permanently secures the mounting plate on the case, and, as shown to advantage in FIG. 7, the outer end of bolt 24 is uniplanar with plate 23.

A shoulder stud 27 depends from the lower central face of plate 23 adjacent one end thereof and a bolt 28, which is aligned with shoulder stud 27 is adapted for threaded engagement with plate 23, adjacent the opposite end of the plate, and extends into a recess 29 in the bottom of the case 20, as shown in FIG. 10.

The swivel wheel unit includes a flat clamp plate 30 of substantially the same size as mounting plate 23 and adapted for contiguous engagement therewith. Clamp plate 30 includes a plurality of support rods 31, one end of each of which is fixed in complemental openings adjacent each corner of the clamp plate. The opposite end of each support rod 31 extends through openings in a swivel unit support plate 32. Bolts 33 are threadedly engaged in terminal threaded openings of support rods 31 for retaining swivel unit support plate 32 in engagement with the rods, as shown in FIG. 11. Convolute springs 34 on rods 31 serve to exert constant tension on wheel unit support plate 32 to urge the latter away from clamp plate 30. This effects a shock-resistant mounting for dampening vibration of case 20 and its contents when the case is rolled from place to place.

As shown in FIGS. 8 and 9, clamp plate 30 is provided with a keyhole slot 35 which is adjacent to, but spaced from one end of the plate between end support rods 31. This facilitates engagement of clamp plate 30 with mounting plate 23. The enlarged portion of the keyhole slot is of a size to permit passage of the head of shoulder stud 27 therethrough and the reduced slotted portion thereof is slightly larger than the shank portion of the shoulder stud. In conjunction with keyhole slot 35, there is also provided an aligned slot 36 extending inwardly from the opposite end of plate 30 which is adapted to receive the threaded shank of bolt 28. Therefore, when clamp plate 30 is to be attached to mounting plate 23, the two plates are placed in contiguous engagement in the position shown in FIG. 9, with the head of shoulder stud 27 protruding through the enlarged portion of keyhole slot 35. Clamp plate 30 may then be slid, as indicated in FIG. 8, so that the shank portion of shoulder stud 27 is positioned in the smaller slotted portion of keyhole slot 35 and bolt 28 lies in recess slot 36. Accidental disengagement of the two plates is then positively prevented by tightening of bolt 28. Wheel unit support plate 32 is broken away at 32a to facilitate access to bolt 28 for tightening and loosening the same with a screwdriver.

A wheel support member 37 is centrally swivelly connected to wheel unit support plate 32 by a conventional stud 38. The wheel support member includes an annular recess 39 forming a recess for the reception of ball bearings 40 for facilitating swivel movement of the wheel unit. The lateral terminals of wheel support member 37 are bent downwardly to form spaced flanges 41, the lower terminals of which are connected by an axle 42 on which a wheel member 43 is rotatably supported.

Stationary caster assembly 22 is basically of the same construction as swivel caster 21 and accordingly, like parts are identified by like, primed numbers. Referring to FIG. 6, it will be seen that for the stationary caster assembly, a wheel support member 44 is directly interposed between the heads of bolts 33' and the near terminals of convolute springs 34'. Lateral portions of wheel support member 44 are bent downwardly to form opposed flanges 45 through the lower terminals of which axle 42 is passed for supporting wheel member 43.

In use, pairs of mounting plates 23, 23' are fixed to each corner of the case or other object to be rolled about, in the manner illustrated in FIG. 7. Each wheel unit is next attached to a mounting plate in the manner above described, the steps of which are illustrated in FIGS. 8 and 9. Installation is completed by tightening bolts 28, 28' to frictionally hold clamp plates 30, 30' against mounting plates 23, 23'.

After the case or the like has been rolled to its destination, the wheel units may be readily and quickly detached by loosening bolts 28, 28' and reversing the steps employed in attaching the wheel unit to the mounting plate. The wheel units may then be stored until needed again, or may be attached to another object to be rolled about. In this way, a minimum number of the wheel unit portions of the assembly may be detached from one object when not needed and attached to another, thereby considerably reducing the number of wheel units necessary for a plurality of cases or the like which individually may be left in one place for an appreciable period of time. This correspondingly reduces the overall cost involved in employing caster assemblies on a plurality of cases, etc.

In the modified form of invention shown in FIGS. 12 to 17 a caster assembly 46 is shown applied to an object 47. In this form of the invention, caster assembly 46 includes a mounting plate 48 having a stud 49 extending from the lower face thereof adjacent a central edge of the plate with which is aligned a spaced shoulder stud 50 and a lock pin 51. As shown to advantage in FIGS. 15, 16 and 17, lock pin 51 extends through an opening in the bottom of object 47, the upper terminal of which has a head 52 which engages a terminal of a leaf spring 53. The opposite terminal of the leaf spring 53 is secured to the bottom of object 47 by a nut and bolt assembly 54. The terminal of pin 51, remote from spring 53, passes through an opening in mounting plate 48 and extends downwardly below the surface of the mounting plate.

Caster assembly 46 further includes a clamp plate 55 provided with a central keyhole slot 56 adapted for the reception of shoulder stud 50 in the manner described above in connection with the invention illustrated in FIGS. 1 to 11. Clamp plate 48 is further provided with a terminal slot 57 adapted for engagement with stud 49 and a terminal slot 58 adapted for engagement with lock pin 51. As shown in FIGS. 13 and 14, keyhole slot 56 and terminal slots 57 and 58 are aligned longitudinally of plate 55. The wheel unit of caster assembly 46 additionally includes components similar to those of stationary caster assembly 22 and includes support rods 59, convolute springs 60, a wheel support member 61 having flanges 62 through the lower terminals of which an axle 63 passes for rotatably mounting a wheel mounting 64. The modified form of wheel assembly shown in FIGS. 12 to 17 is also equally applicable to a swivel type caster assembly in a manner similar to that illustrated in FIG. 5.

In attaching the wheel unit of caster assembly 46 to mounting plate 48, clamp plate 55 is superimposed on the mounting plate, as shown in FIG. 14, with pin 51 depressed as shown in FIG. 15, so that the lower terminal thereof is uniplanar with the lower face of mounting plate 48. Clamp plate 55 is then slid with respect to mounting plate 48 so that stud 49 enters slot 57, shoulder stud 50 moves into the narrowed portion of keyhole slot 56 and lock pin 51 enters slot 58 under tension of spring 53, as shown in FIG. 17. This positively precludes accidental disengagement of the wheel unit from the mounting plate.

For removing the wheel unit from the mounting plate, pin 51 is depressed against the tension of spring 53 by any suitable tool, until it is above the plane of clamp plate 55, at which time the latter may be slid back to the position shown in FIG. 14 for ready removal of the wheel unit.

While there has been herein shown and described the presently preferred forms of the present invention, it is to be understood that various changes may be made therein within the scope of the claims hereto appended.

We claim:

1. A caster assembly for attachment to an object to be rolled from place to place, the assembly including a flat substantially rectangular mounting plate fixedly secured to the object, a headed stud depending from said mounting plate, securing means depending from said mounting plate in spaced relation to said stud, and a wheel unit adapted for detachable engagement with said mounting plate, the wheel unit including a flat, substantially rectangular clamp plate having a keyhole slot adapted to receive the stud of said mounting plate, terminal recess means in said clamp plate for the reception of said securing means, support rods secured to said clamp plate and extending downwardly therefrom, wheel support means having strategically positioned openings through which said support rods are adapted to pass, means for holding said wheel support means on said support rods, spring means interposed between said clamp plate and wheel support means for normally urging the same apart, the wheel unit further including a wheel member rotatably supported by said wheel support means.

2. The caster assembly of claim 1, wherein said securing means comprises a bolt, the shank of which extends through said terminal recess means, said bolt being tightened to frictionally hold said clamp plate in contiguous relation with said mounting plate, said bolt being loosened to permit disengagement of said wheel unit from said mounting plate.

3. The caster assembly of claim 1, wherein said securing means includes a second stud depending from said mounting plate adjacent one end thereof, and a spring-pressed pin depending from said mounting plate, the clamp plate having terminal recesses adapted to receive said second stud and spring-pressed pin for locking the wheel unit to said mounting plate, the spring-pressed pin being depressed to permit removal of the wheel unit from the mounting plate.

4. The caster assembly of claim 1, wherein said studs and spring-pressed pin of the mounting plate and said terminal recesses and keyhole slot of said clamp plate are in axial alignment.

References Cited by the Examiner

UNITED STATES PATENTS

| 1,085,693 | 2/1914 | McKinney. | |
|---|---|---|---|
| 1,454,282 | 5/1923 | Holbrook | 16—40 |
| 2,478,563 | 8/1949 | Book | 16—40 |
| 2,834,608 | 5/1958 | Wixson | 16—44 |

BOBBY R. GAY, *Primary Examiner.*

PATRICK A. CLIFFORD, *Examiner.*

D. L. TROUTMAN, *Assistant Examiner.*